(12) United States Patent
Royer et al.

(10) Patent No.: US 8,943,790 B2
(45) Date of Patent: Feb. 3, 2015

(54) DRAG TRAIN TRANSPORTER AND CARRIER

(71) Applicant: Nabors Drilling USA, Houston, TX (US)

(72) Inventors: Ted Royer, Houston, TX (US); Todd Fox, Houston, TX (US)

(73) Assignee: Nabors Drilling USA, Houston, TX (US)

( * ) Notice: Subject to any disclaimer, the term of this patent is extended or adjusted under 35 U.S.C. 154(b) by 0 days.

(21) Appl. No.: 14/172,104

(22) Filed: Feb. 4, 2014

(65) Prior Publication Data

US 2014/0215996 A1    Aug. 7, 2014

Related U.S. Application Data

(60) Provisional application No. 61/761,389, filed on Feb. 6, 2013.

(51) Int. Cl.
*F16G 13/16* (2006.01)

(52) U.S. Cl.
CPC . *F16G 13/16* (2013.01); *Y10S 59/90* (2013.01)
USPC ............................. 59/78.1; 59/900; 248/49

(58) Field of Classification Search
CPC ..................................................... F16G 13/16
USPC ......................................... 59/78.1, 78, 80, 900
See application file for complete search history.

(56) References Cited

U.S. PATENT DOCUMENTS

| 3,779,003 | A  | * | 12/1973 | Boissevain et al. | 248/49 |
| 5,649,415 | A  | * | 7/1997  | Pea              | 59/78.1 |
| 6,158,555 | A  | * | 12/2000 | Brown, Jr.       | 248/49 |
| 6,481,195 | B1 | * | 11/2002 | Blase            | 59/78.1 |
| 6,730,850 | B2 | * | 5/2004  | Tsutsumi et al.  | 248/49 |
| 8,490,377 | B2 | * | 7/2013  | Holden et al.    | 59/78.1 |

* cited by examiner

*Primary Examiner* — David B Jones
(74) *Attorney, Agent, or Firm* — Adolph Locklar

(57) ABSTRACT

An apparatus for transporting a drag chain service loop comprising a frame, wherein said frame encloses the drag chain, and wherein said frame may be attached directly to a drilling rig mast while said drag chain remains enclosed therein.

10 Claims, 3 Drawing Sheets

DRAG TRAIN TRANSPORTER AND CARRIER

CROSS-REFERENCE TO RELATED APPLICATIONS

This application is a non-provisional application which claims priority from U.S. provisional application No. 61/761,389, filed Feb. 6, 2013.

FIELD OF THE DISCLOSURE

The present disclosure is related generally to cable protection devices, and specifically to a drag chain carrier apparatus.

BACKGROUND OF THE DISCLOSURE

In many industrial environments, flexible cables or hoses need to be coupled to moving subassemblies of an apparatus. In some cases, a drag chain is utilized. Drag chains are typically made up of a plurality of links positioned such that each link includes a mechanism to support a flexible cable or hose passing therethrough. As the subassembly moves, the drag chain serves to provide support and flex with the flexible cable or hose to, for example, prevent pinching, shearing, or kinking of the flexible cable or hose.

For example, on a drilling rig, a top drive is positioned to move upwards and downwards to support or lift a drilling or tool string during normal operations. Because multiple hoses and wires must be coupled between the top drive and other rig equipment, including mud pumps, generators, etc., a drag chain may be used to protect these flexible components from damage. During different operations of a drilling rig, however, different cable and hose configurations may be needed. Drag chains may have to be assembled as part of the drilling rig.

SUMMARY

The present disclosure provides for a drag chain transport apparatus. The drag chain transport apparatus may include a frame and a drag chain. The drag chain may be formed from a plurality of drag chain links. The drag chain may be positioned generally within the frame. The drag chain may have a first and a second end, the first end of the drag chain permanently coupled to the frame. The drag chain may have at least one flexible cable or hose coupled thereto and running the length thereof.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1A:
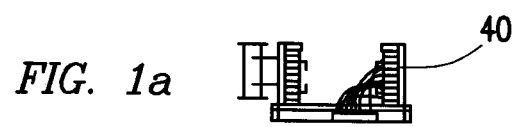
FIG. 1a is a top view of the drag chain and drag chain frame that is consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
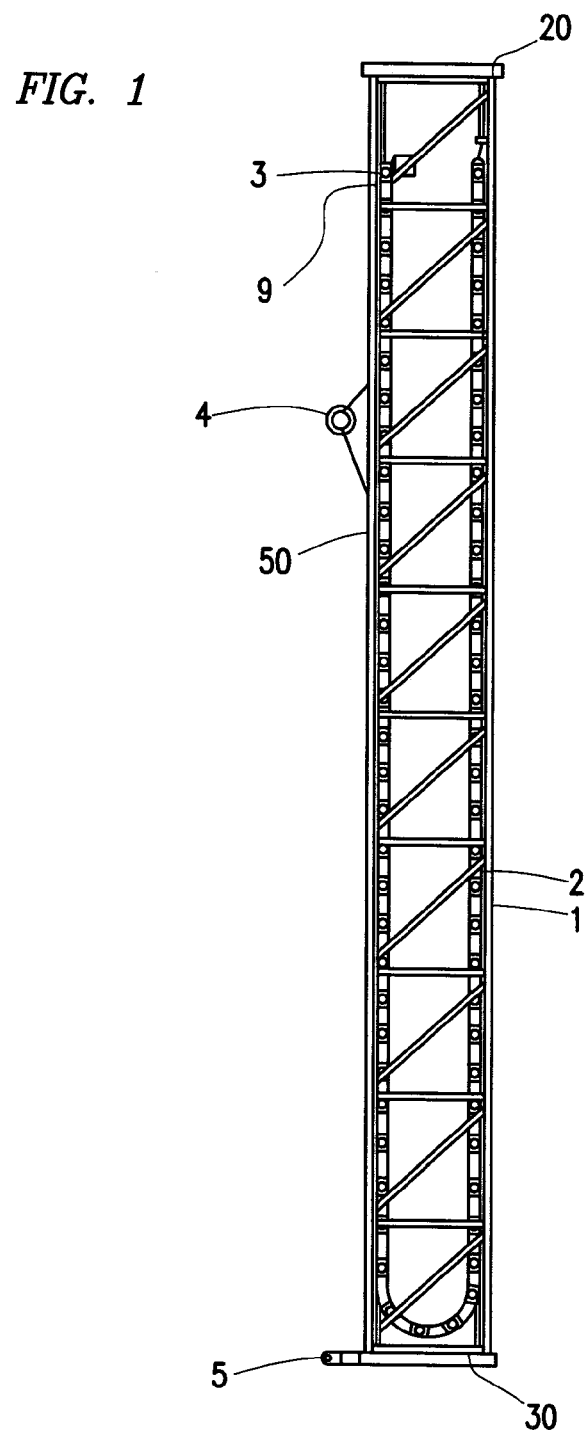
FIG. 1 is a side view of a drag chain and drag chain frame that is consistent with at least one embodiment of the present disclosure.

FIG. 1 depicts one embodiment of the drag chain frame ("frame") 1. In some embodiments, frame 1 may be a rectangular enclosure. In some embodiments, frame 1 may be formed as a generally rectangular box structure made up of a plurality of beams or girders. In some embodiments, drag chain 2 may be positioned within frame 1. Drag chain 2 may be made up of a plurality of links, each coupled to form a continuous chain from a first end to a second end of drag chain 2. Each link of drag chain 2 may include a fastening feature positioned to couple to one or more flexible cables or hoses. Each flexible cable or hose may thus traverse the length of drag chain 2, allowing their flexing or bending to be controlled by the flexing or bending of drag chain 2. In some embodiments, one end of drag chain 2 may be coupled to frame 1 at a permanent connection point. In some embodiments, magazine 40 (as depicted in FIG. 1A) may be positioned to, for example, allow each cable or hose to be coupled to other components of the drilling rig, such as, for example and without limitation, power supplies, hydraulic fluid supplies, mud pumps, etc.

FIG. 1 depicts frame 1 in its undeployed or shipping configuration. During shipment or before deployment, drag chain 2 may be positioned completely within frame 1, and held in place by coupling drag chain far end 9, defined as the end of drag chain 2 not permanently coupled to frame 1, to frame 1. In some embodiments, drag chain far end 9 is coupled to frame 1 by shipping pin 3. Shipping pin 3 may be inserted into drag chain far end 9 to retain drag chain 2 within frame 1, and thus prevent drag chain far end 9 from, for example, moving during shipping or falling out of the interior of frame 1. One having ordinary skill in the art with the benefit of this disclosure will understand that other means for retaining drag chain far end 9 within frame 1 for shipping or storage purposes may be substituted without deviating from the scope of this disclosure. In other embodiments, any suitable method of holding drag chain 2 in place may be substituted, including, for instance, by bolting drag chain far end 9 within frame 1.

Figure 2:
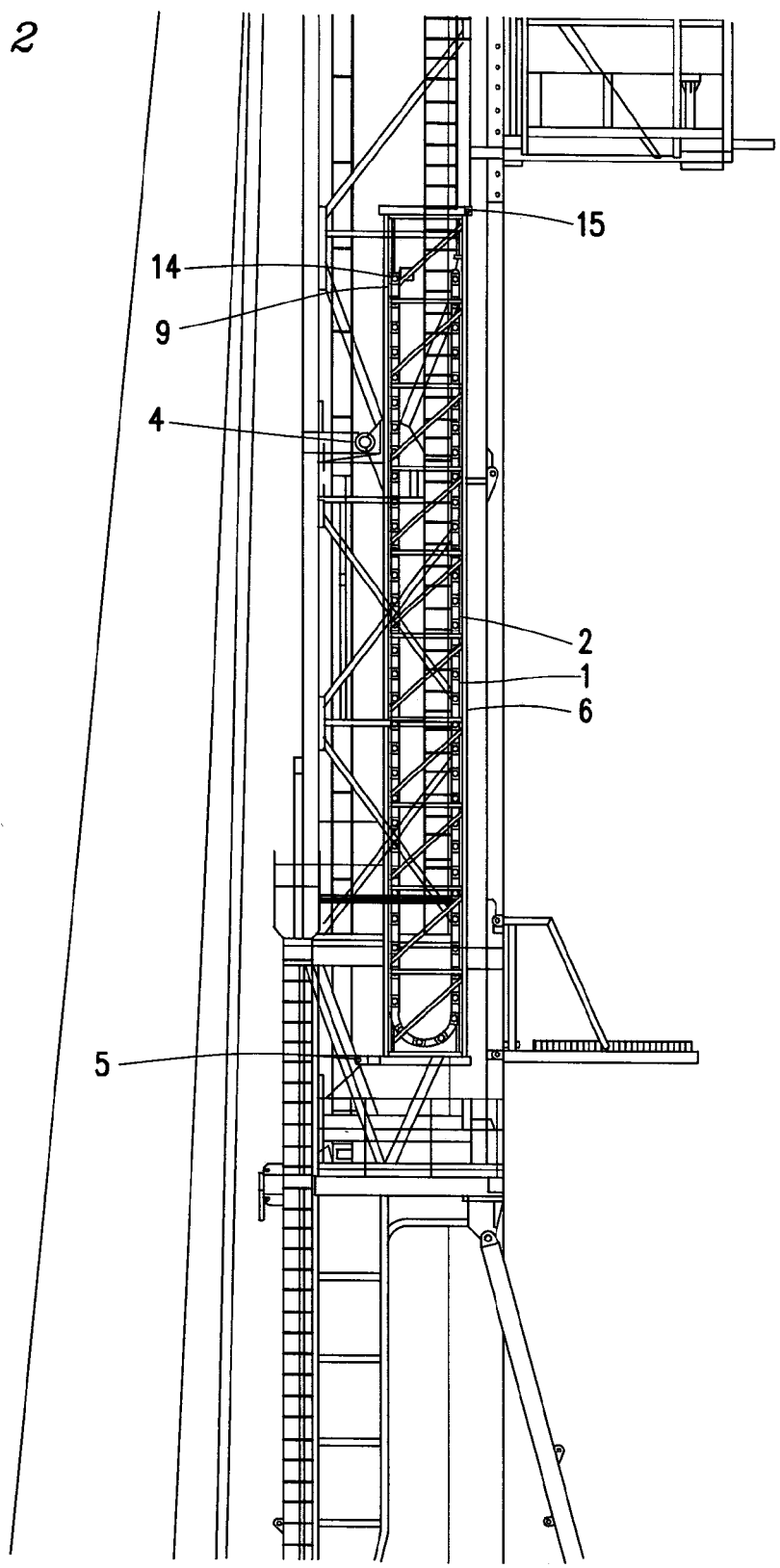
FIG. 2 is a side view of a drag chain and drag chain frame attached to a drilling mast that is consistent with at least one embodiment of the present disclosure.

In some embodiments, frame 1 may have one or more couplings positioned to allow frame 1 to be coupled to the mast of a drilling rig. As depicted in FIGS. 1, 2, frame 1 may include upper coupling 4 and lower coupling 5 positioned to allow frame 1 to be coupled to rig mast 6. Upper coupling 4, as depicted in FIGS. 1, 2, may be attached to frame outer surface 50, by, for example, welding or bolting into place. Upper coupling 4 may be of any suitable form to enable disassemble connection of frame 1 to the rig mast. For example, upper coupling 4 may allow frame 1 to be coupled to and released from rig mast 6. In certain embodiments of the present disclosure, upper coupling 4 is a boltless connection to the mast. In some embodiments, upper coupling 4 may be, for example, a J-hook. In some embodiments, frame 1 is attached to the mast via a hook and pin system. In some embodiments, such as that shown in FIGS. 1, 2, lower coupling 5 may be attached to outer surface 50 of frame 1 near frame bottom 30. Lower coupling 5 may act to hold frame bottom 30 to the rig mast and limit the movement of frame 1 with respect to rig mast 6.

Referring to FIG. 2, in order to utilize drag chain 2 with the drilling rig, frame 1 with drag chain 2 included in the shipping position previously described, may be coupled to the drilling rig mast 6 at upper coupling 4 and lower coupling 5. Any hoses or cables included in drag chain 2 and coupled to magazine 40 may be attached to associated equipment on the drilling rig. Drag chain far end 9 may be decoupled from frame 1. Drag chain far end 9 may then be coupled to top drive 14, and the cables and hoses be operably coupled thereto. As top drive 14 is moved upward and downward, drag chain far end 9 is likewise lifted or lowered, causing drag chain 2 to be pulled upward or downward, allowing for a continuous connection between magazine 40 and top drive 14.

Figure 3:
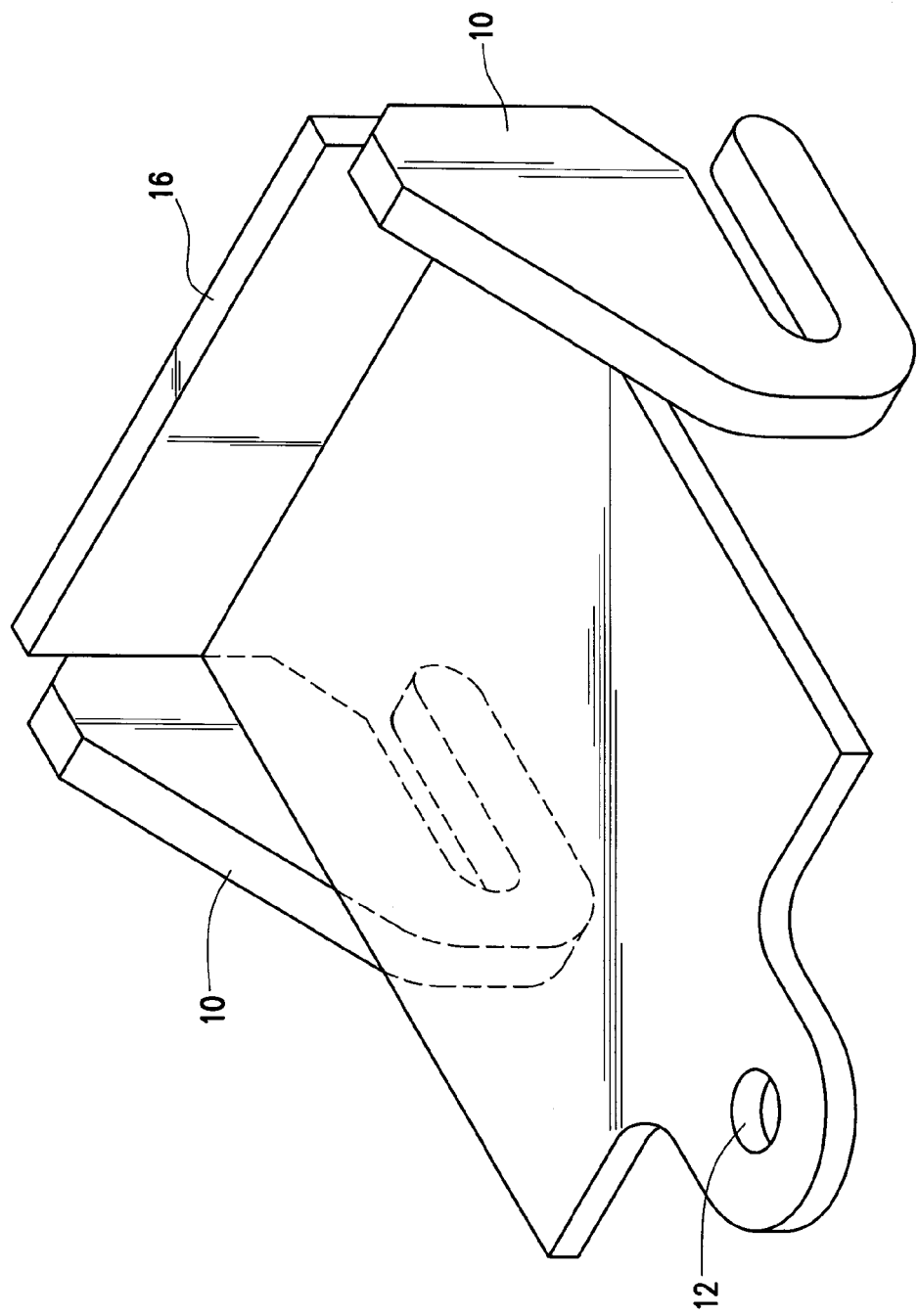
FIG. 3 is a depiction of a top drive j-hook and pin connector that is consistent with at least one embodiment of the present disclosure.

In some embodiments, drag chain 2 may be coupled to top drive 14 via a hook and pin connector apparatus. Top drive 14 may include top drive hook and pin coupler 16 as depicted in FIG. 3, designed to couple to a mating hook and pin coupler positioned on drag chain far end 9. In some embodiments, the hook and pin coupler positioned on drag chain far end 9 may include pins positioned to couple onto J-hooks 10 of top drive hook and pin coupler 16. In some embodiments, drag chain far end 9 may be secured to top drive hook and pin coupler 16 by, for example and without limitation, inserting a pin into pin hole 12. The pin may likewise allow drag chain 2 to self-center while hanging from top drive 14, thereby allowing lateral back and forth movement of drag chain 2 during normal operations.

In some embodiments, after operations requiring drag chain 2 are completed, drag chain 2 may be decoupled from top drive 14, and recoupled to frame 1, secured by shipping pin 3. Any cables or hoses coupled to rig equipment at magazine 40 may likewise be decoupled. Frame 1 may then be decoupled from rig mast 6, allowing frame 1 and drag chain 2 to be removed from the drilling rig to, for example, relocate them elsewhere such as, for example, to another drilling rig or rig site.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

What is claimed is:

1. A drag chain transport apparatus comprising:
   a frame, and
   a drag chain, the drag chain formed from a plurality of drag chain links, the drag chain positioned generally within the frame, the drag chain having a first and a second end, the first end of the drag chain permanently coupled to the frame, the drag chain having at least one flexible cable or hose coupled thereto and running the length thereof, the at least one flexible cable or hose having a first end, generally positioned near the first end of the drag chain, the first end of the at least one flexible cable or hose coupled to a magazine, the magazine positioned to operatively couple the at least one flexible cable or hose to other drilling rig equipment.

2. The drag chain transport apparatus of claim 1, wherein the second end of the drag chain being selectively coupleable to the frame.

3. The drag chain transport apparatus of claim 1, wherein the frame further comprises one or more frame couplers positioned to allow the frame to be selectively coupled to the mast of a drilling rig.

4. The drag chain transporter apparatus of claim 3, wherein the frame couplers are positioned to couple to rig mast couplers positioned on the mast of the drilling rig.

5. The drag chain transporter apparatus of claim 4, wherein the frame couplers and rig mast couplers are hook and pin couplers.

6. The drag chain transporter apparatus of claim 4, wherein the frame couplers and rig mast couplers are pin couplers.

7. The drag chain transport apparatus of claim 1, wherein the second end of the drag chain is selectively coupleable to a top drive.

8. The drag chain transport apparatus of claim 7, wherein the second end of the drag chain includes a drag chain coupler positioned to couple to a top drive coupler positioned on the top drive.

9. The drag chain transporter apparatus of claim 8, wherein the drag chain coupler and the top drive coupler couple by a pin-hook connection.

10. The drag chain transporter apparatus of claim 9, wherein the drag chain coupler and the top drive coupler couple by use of a pin.

* * * * *